(12) United States Patent
Sloan et al.

(10) Patent No.: US 8,558,837 B2
(45) Date of Patent: Oct. 15, 2013

(54) MODULAR RADIANCE TRANSFER

(75) Inventors: Peter-Pike Johannes Sloan, Cottonwood Heights, UT (US); Lakulish Antani, Chapel Hill, NC (US)

(73) Assignee: Disney Enterprises, Inc., Burbank, CA (US)

( * ) Notice: Subject to any disclaimer, the term of this patent is extended or adjusted under 35 U.S.C. 154(b) by 835 days.

(21) Appl. No.: 12/726,627

(22) Filed: Mar. 18, 2010

(65) Prior Publication Data

US 2011/0175913 A1 Jul. 21, 2011

Related U.S. Application Data

(60) Provisional application No. 61/295,985, filed on Jan. 18, 2010.

(51) Int. Cl.
*G06T 15/50* (2011.01)
*G06T 15/60* (2006.01)

(52) U.S. Cl.
USPC ............................................ 345/426

(58) Field of Classification Search
USPC ............................................ 345/426
See application file for complete search history.

(56) References Cited

U.S. PATENT DOCUMENTS 6,677,957 B2 * 1/2004 Grzeszczuk et al. .......... 345/582
8,279,220 B1 * 10/2012 Pantaleoni ..................... 345/426

OTHER PUBLICATIONS

Ashdown, Ian. "Eigenvector Radiosity." PhD diss., The University of British Columbia, 2001.*
Kristensen, Anders Wang, Tomas Akenine-Möller, and Henrik Wann Jensen. "Precomputed local radiance transfer for real-time lighting design." ACM Transactions on Graphics (TOG). vol. 24. No. 3. ACM, 2005.*
Hašan, Miloš, Fabio Pellacini, and Kavita Bala. "Matrix row-column sampling for the many-light problem." ACM Transactions on Graphics (TOG) 26.3 (2007): 26.*
Lehtinen, Jaakko. "A framework for precomputed and captured light transport." ACM Transactions on Graphics (TOG) 26.4 (2007): 13.*
Lewis, Robert R. Light-Driven Global Illumination with a Wavelet Representation of Light Transport. Diss. The University of British Columbia, 1998.*
Meyer, Mark, and John Anderson. "Statistical acceleration for animated global illumination." ACM Transactions on Graphics (TOG). vol. 25. No. 3. ACM, 2006.*
Hašan, Miloš, Fabio Pellacini, and Kavita Bala. "Direct-to-indirect transfer for cinematic relighting." ACM Transactions on Graphics (TOG). vol. 25. No. 3. ACM, 2006.*

* cited by examiner

*Primary Examiner* — Aaron M Richer
*Assistant Examiner* — Vu Nguyen
(74) *Attorney, Agent, or Firm* — Patterson & Sheridan LLP

(57) ABSTRACT

Modular radiance transfer pre-computes a spectral decomposition of a one bounce transport operator for each of a set of shapes and replaces a scene dependent direct-to-indirect transfer lighting computation with an art-directable mapping step. Modular radiance transfer provides an approach for rendering an approximate indirect lighting which requires small amounts of data, can be used to model very large (or even random scenes), and propagates much of the indirect lighting using a small number of spectral coefficients, so that rendering scales well to large scenes.

22 Claims, 9 Drawing Sheets

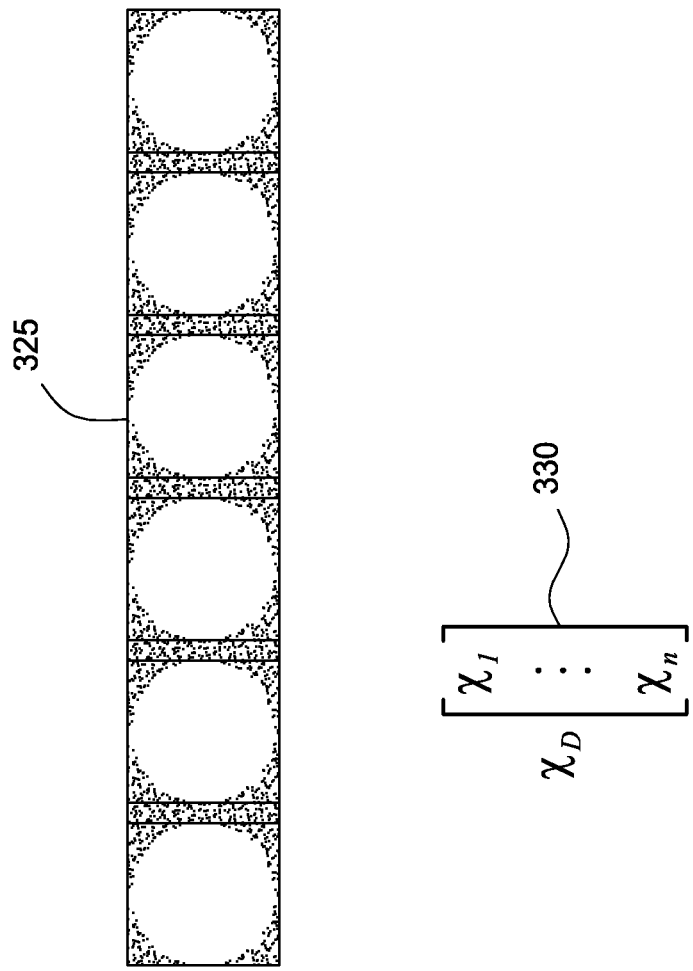
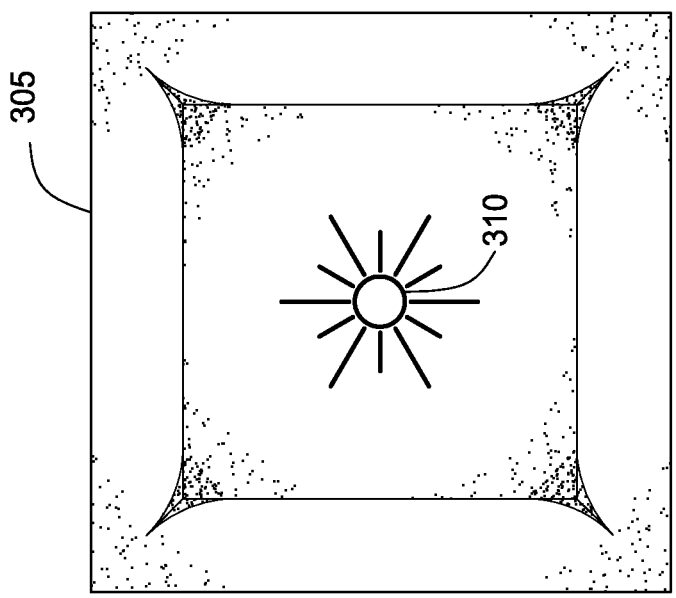
FIG. 3

$$A = \begin{bmatrix} \chi_1 & \chi_2 & \ldots & \chi_{m-1} & \chi_m \end{bmatrix}_{410} \quad \begin{bmatrix} p_1 & \ldots & p_b \end{bmatrix}_{415}$$

FIG. 4

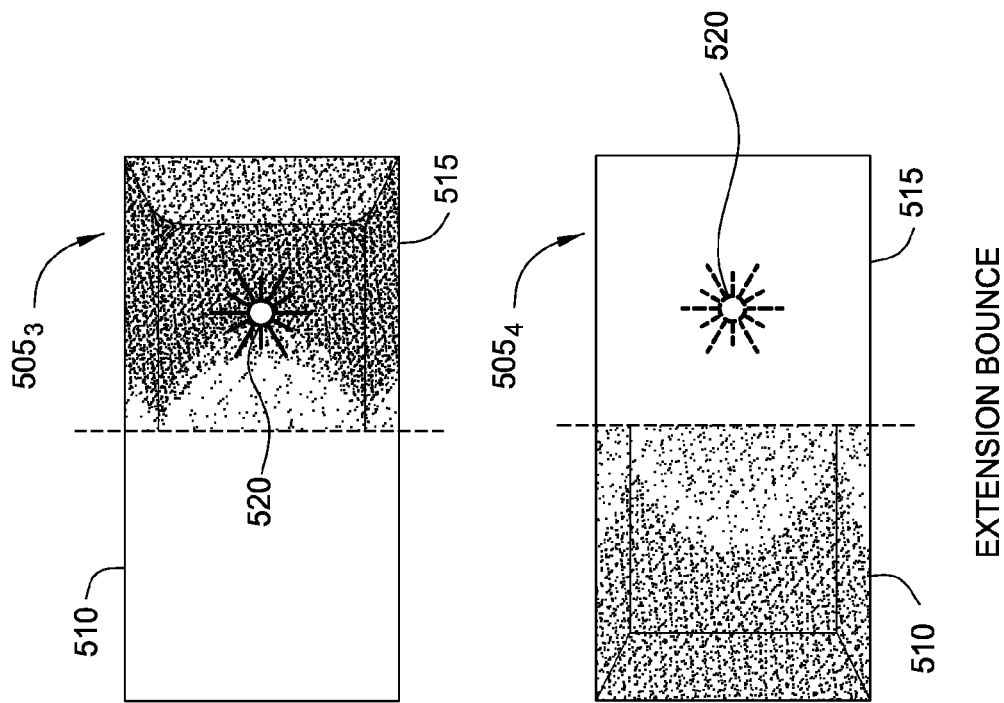
FIG. 5B EXTENSION BOUNCE
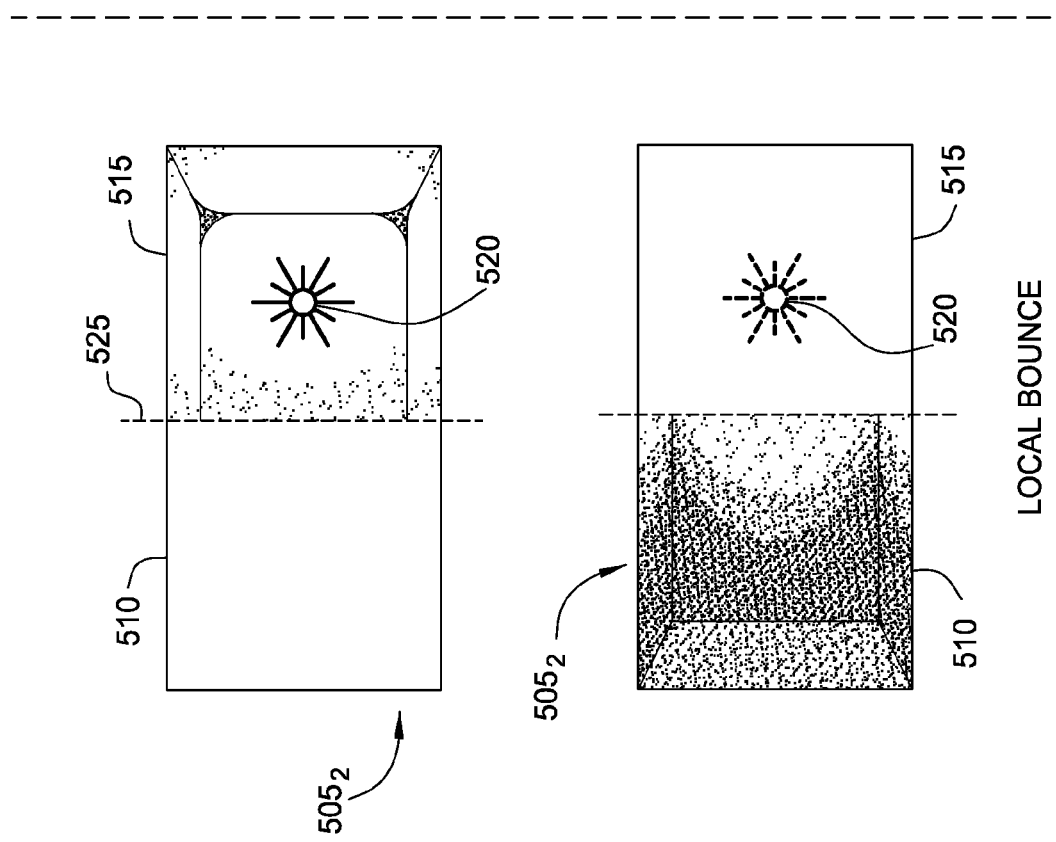
FIG. 5A LOCAL BOUNCE

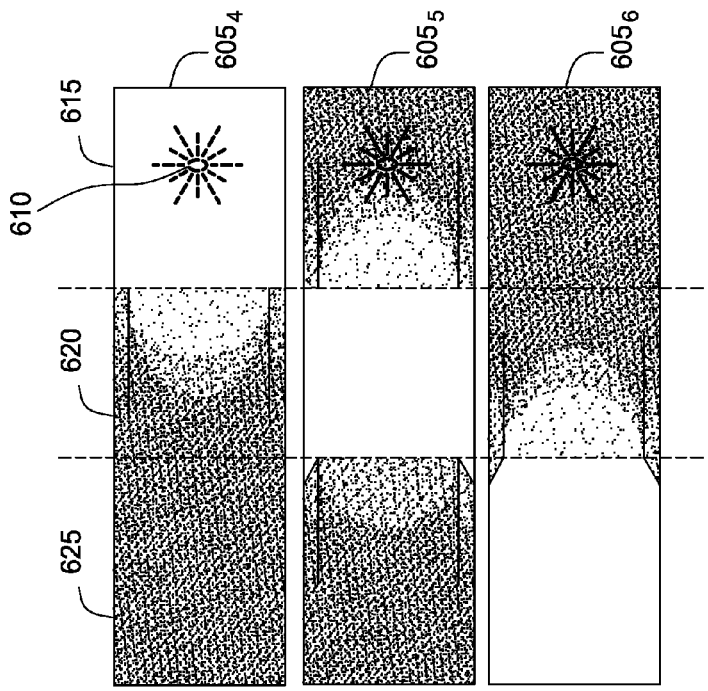
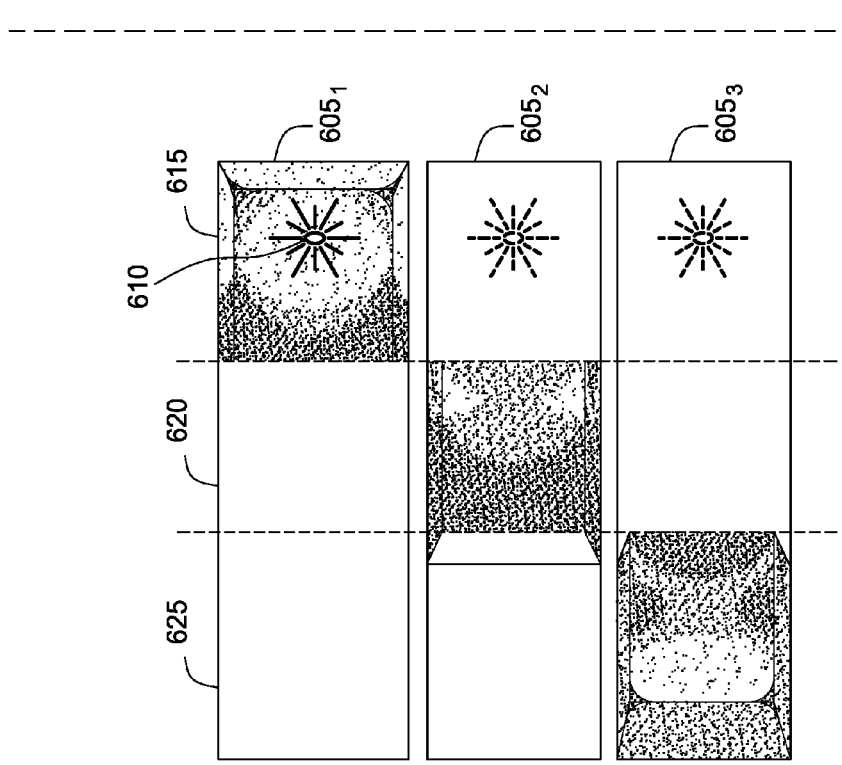

MODULAR RADIANCE TRANSFER

CROSS-REFERENCE TO RELATED APPLICATIONS

This application claims benefit of U.S. provisional patent application Ser. No. 61/295,985, filed Jan. 18, 2010 which is herein incorporated by reference in its entirety.

BACKGROUND

1. Field of the Invention

The present invention relates to the field of computer graphics and, in particular, to techniques for computing indirect lighting levels present within a computer-generated graphics scene.

2. Description of the Related Art

It is currently common for video games to pre-compute elements of direct or indirect lighting (or both) for a given set of three-dimensional (3D) scene geometry. The pre-computed lighting levels are then used to light elements of the scene geometry at runtime. Typically, pre-computation techniques may be used to render indirect lighting for the 3D scene geometry using an arbitrary direct lighting scenario. The indirect lighting is usually pre-computed for the 3D scene geometry, as the techniques currently employed lack the performance characteristics necessary for video games (i.e., they lack the performance characteristics for computing the indirect lighting in real-time for frames of computer-generated animation).

In practice, game designers and/or lighting artists specify lighting parameters for a scene, and the resulting lighting (both direct and indirect) may be pre-computed. For example, a lighting artist may specify a direct lighting scenario for the 3D geometry of a given scene. In turn, the lighting scenario is evaluated to derive what indirect lighting results from the direct lighting, based on the actual 3D geometry of the scene. While this approach for pre-computing direct/indirect lighting is capable of generating compelling results, the work flow for the lighting artist is somewhat less than ideal. For example, this approach often relies on overnight processing on large render farms to derive the indirect lighting results. Thus, in practice, a lighting artist may make changes to a given scene and then have to wait several hours before being able to observe and evaluate the results. Stated more generally, the process of pre-computing indirect lighting using direct-to-indirect transfer computations (and other pre-computed lighting techniques), generates accurate indirect lighting, but often suffers from long pre-compute times, large datasets and modest frame rates.

SUMMARY

Embodiments of the invention provide a technique for computing indirect lighting for complex scene geometry using indirect lighting data pre-computed for a set of simple, abstract shapes. The pre-computed indirect lighting is then mapped to the actual 3D geometry of the graphics scene. One embodiment of the invention includes a method for computing indirect lighting in a three-dimensional (3D) graphics scene. The method may generally include providing a palette of shapes to represent 3D scene geometry. And for each shape, sampling a plurality of direct lighting states for the shape, generating a lighting prior from the sampled plurality of direct lighting states, and computing, from the lighting prior, a factorized transport operator. The factorized transport operator takes an arbitrary direct lighting state for the shape and returns a corresponding indirect lighting state. The method may also include computing one or more extension operators, where each extension operator computes indirect lighting between two shapes from the plurality of shapes when adjacent to one another in a representation of the 3D scene geometry. The method may also include computing one or more interfaces for propagating indirect lighting between non-adjacent shapes.

Another embodiment of the invention includes a computer-readable storage medium storing instructions that, when executed by a processor, cause a computer system to perform an operation for computing indirect lighting in a three-dimensional (3D) graphics scene. The operation may generally include providing a palette of shapes to represent 3D scene geometry. And for each shape, sampling a plurality of direct lighting states for the shape, generating a lighting prior from the sampled plurality of direct lighting states, and computing, from the lighting prior, a factorized transport operator. The factorized transport operator takes an arbitrary direct lighting state for the shape and returns a corresponding indirect lighting state. The operation may also include computing one or more extension operators, where each extension operator computes indirect lighting between two shapes from the plurality of shapes when adjacent to one another in a representation of the 3D scene geometry. The operation may also include computing one or more interfaces for propagating indirect lighting between non-adjacent shapes.

Still another embodiment of the invention includes a system having a processor and a memory configured to perform an operation for computing indirect lighting data for three-dimensional (3D) scene geometry. The operation itself may include dividing the 3D scene geometry into a plurality of chunks and mapping each of the plurality of chunks to a shape provided by a palette of shapes, wherein a factorized transport operator has been pre-computed for each shape in the palette of shapes. The operation may also include computing an indirect lighting state for the shapes mapped to by the plurality of shapes using a sample of direct lighting for the 3D scene geometry and the factorized transport operator computed for the shapes and mapping the indirect lighting state computed for the shapes mapped to by the plurality of shapes to the 3D scene geometry.

Yet another embodiment of the invention includes a method for determining indirect lighting for 3D scene geometry. The method may generally include dividing the 3D scene geometry into a plurality of chunks and mapping each of the plurality of chunks to a shape provided by a palette of shapes, where the factorized transport operator has been pre-computed for each shape in the palette of shapes. The method may also include computing an indirect lighting state for the shapes mapped to by the plurality of shapes using a sample of direct lighting for the 3D scene geometry and the factorized transport operator computed for the shapes and mapping the indirect lighting state computed for the shapes mapped to by the plurality of shapes to the 3D scene geometry.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3 is an example illustration of a spherical light used to light a simple shape, according to one embodiment of the invention.

FIG. 4 illustrates an example of a lighting prior generated from multiple direct lighting samples, according to one embodiment of the invention.

FIGS. 5A-5B illustrate an example of a pre-computed lighting extension used to represent indirect lighting between adjacent blocks taken from a palette of simple shapes, according to one embodiment of the invention.

FIGS. 6A-6C illustrate an example of a lighting interface pre-computed for a simple shape being used to represent indirect lighting between distant blocks taken from a palette of simple shapes, according to one embodiment of the invention.

DETAILED DESCRIPTION OF EXEMPLARY EMBODIMENTS

Embodiments of the invention provide a technique for determining indirect lighting for elements of 3D scene geometry. Indirect lighting generally refers to lighting that does not result from light emanating from a light source, but rather from the "bounce" of direct lighting from a diffuse surface within 3D scene geometry (e.g., a wall or a floor). In one embodiment, rather than evaluate indirect lighting for a particular geometry of a 3D graphics scene, indirect lighting is pre-computed for a set of simple, abstract shapes. The pre-computed indirect lighting is then mapped to the actual 3D geometry of the graphics scene. More specifically, modular radiance transfer precomputes a spectral decomposition of a one bounce transport operator for each of a set of simple shapes and replaces a scene dependent, direct-to-indirect lighting computation with an art-directable mapping step.

As described herein, modular radiance transfer provides an approach for rendering an approximate indirect lighting state for a set of 3D scene geometry which requires small amounts of data, can be used to model very large (or even random) scenes, and propagates much of the indirect lighting using a small number of spectral coefficients, allowing rendering to scale well to large scenes. Thus, embodiments of the invention provide an artist-friendly work flow which does not require any scene dependent pre-computation. Instead of generating accurate indirect lighting solutions for a given scene geometry and direct lighting scenario, fairly accurate solutions are pre-computed for very simple scene pieces. Advantageously, this allows a lighting artist to modify properties of the mapping between the actual scene geometry and palette of simple shapes to rapidly develop a desired lighting state. For example, artists can overemphasize color bleeding, modify albedos, etc., all using an iterative workflow with rapid updates. At run-time, the indirect lighting solutions are then mapped to the complex geometry present in the given scene (based on the real-time direct lighting conditions). The approximation provided by the modular radiance transfer approach described herein generates plausible indirect lighting, has a low memory overhead, and can be rendered at high frame rates, making it practical for video games.

Further, the modular radiance transfer approach provides an upper bound on the cost of evaluating the indirect lighting at a scene by aggregating distant lighting at interfaces, bounding the number of regions from which indirect light needs to be gathered. A propagation step used to transfer light across interfaces depends on the scene complexity, but can be performed by propagating a few spectral coefficients with sweeps over the scene.

System Overview

Figure 1:
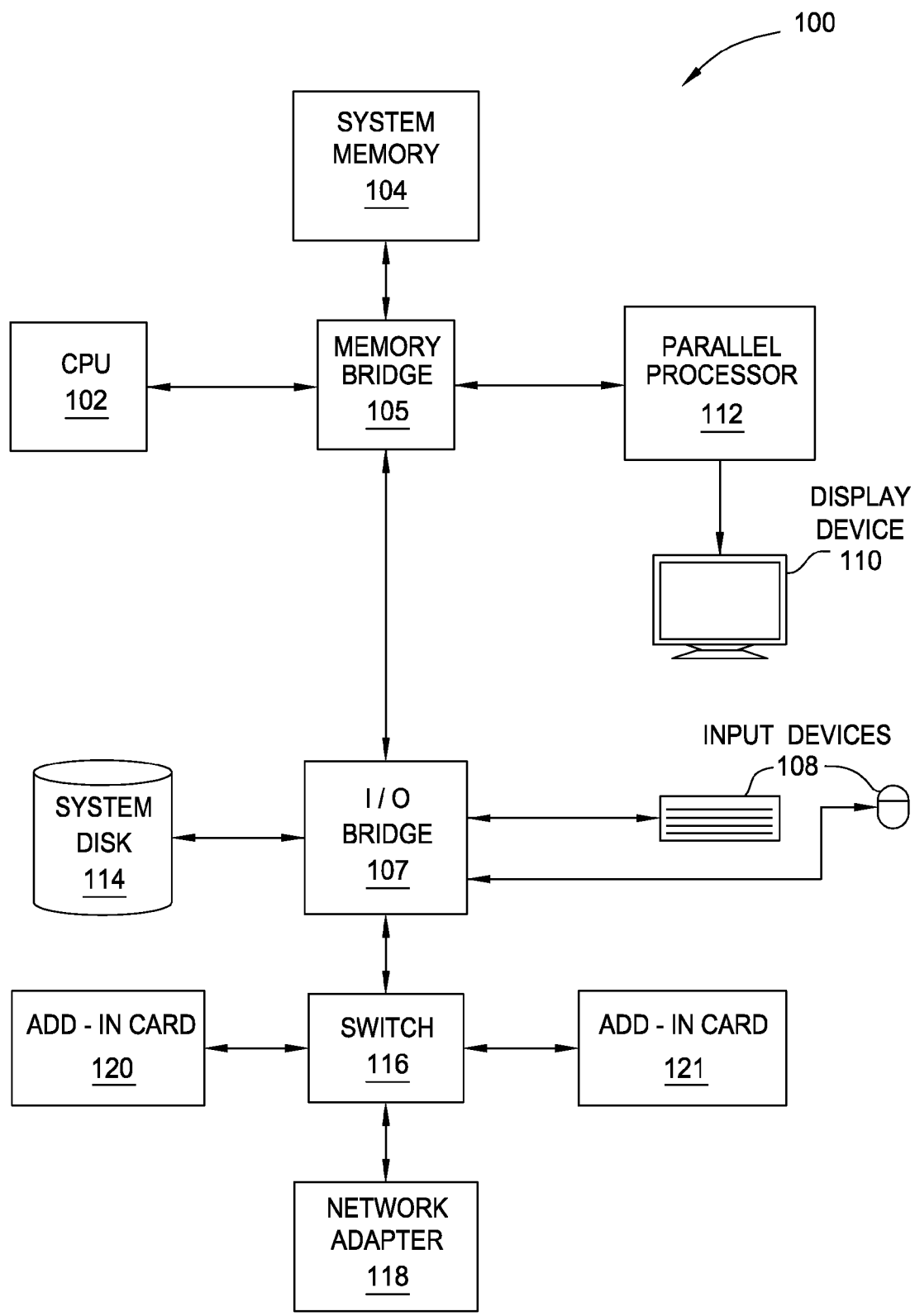
FIG. 1 is a block diagram of a system configured to implement one or more aspects of the present invention.

FIG. 1 is a block diagram of a system 100 configured to implement one or more aspects of the present invention. System 100 may be a computer workstation, personal computer, video game console, personal digital assistant, rendering engine, mobile phone, or any other device suitable for practicing one or more embodiments of the present invention.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Modular Radiance Transfer

Embodiments of the invention provide a technique for computing indirect lighting levels in a graphics scene in real-time with a minimum of pre-computation using, e.g., the system 100 of FIG. 1. Further, the techniques for computing indirect lighting allows the accuracy of the indirect lighting computed at run-time to be varied in order to achieve a desired indirect lighting state (as permitted by the available computing power). In one embodiment, an art-directable mapping step is used to divide a 3D graphics scene into "chunks" of geometry, and each chunk is mapped to a simple shape chosen from a small palette of simple shapes. A factorized transport operator (i.e., a one-bounce transport operator) is pre-computed for each shape in the palette, as well as operators which describe how the indirect lighting in one shape can influence a second shape (also drawn from the same palette) when the two shapes are connected to one another. Spectral decomposition is then used to generate an approximation of the one-bounce transport operator to use when computing indirect lighting for 3D graphics scene geometry. By mapping the palette of simple shapes to the geometry of the complex graphics scene, an approximation of indirect lighting may be determined without any scene-dependent transport simulation (i.e., without simulating direct-to-indirect lighting transfer for the actual scene geometry).

Figure 2:
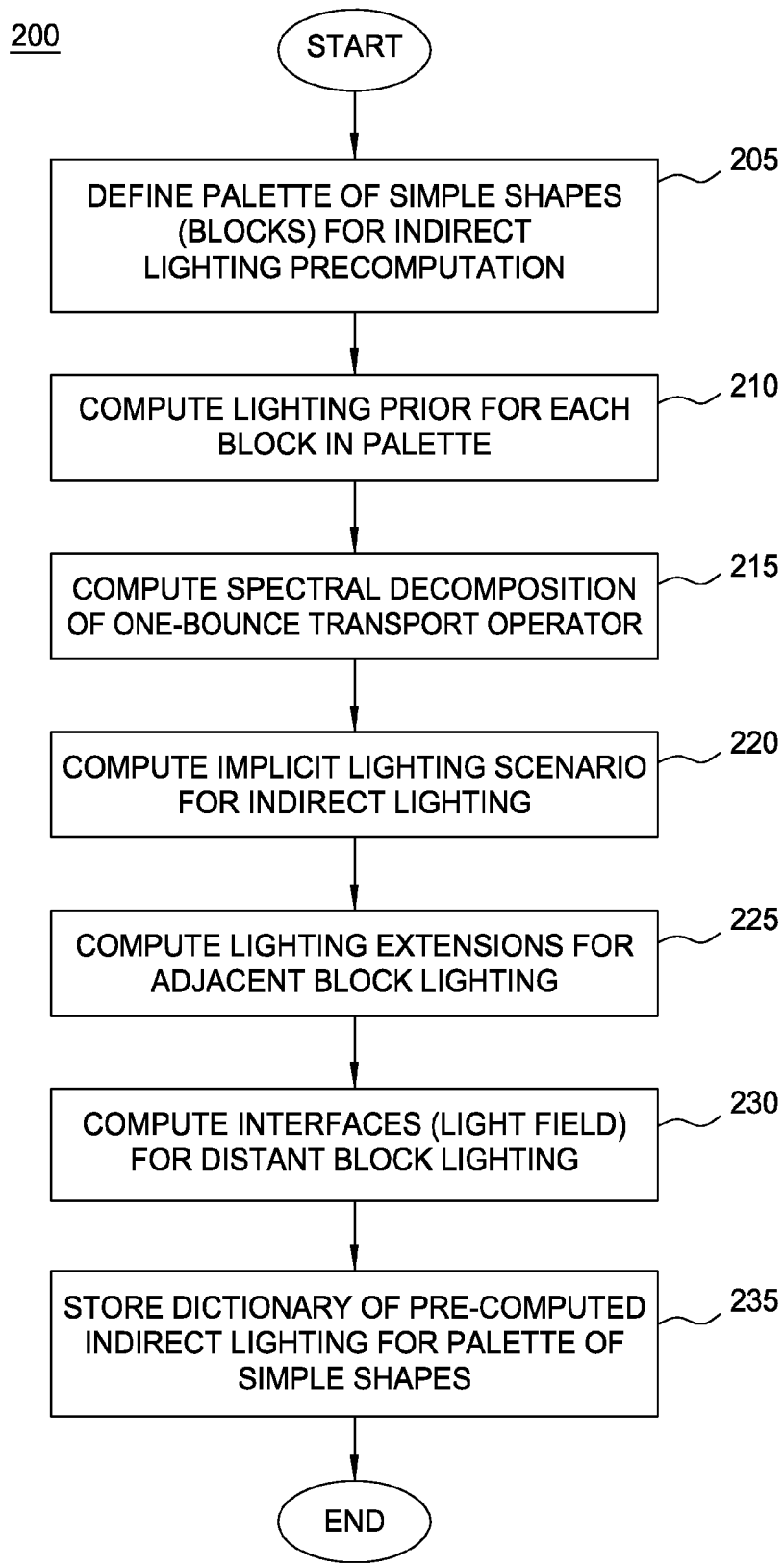
FIG. 2 illustrates a method for pre-computing indirect lighting for a palette of simple shapes (blocks), according to one embodiment of the invention.

FIG. 2 illustrates a method 200 for pre-computing a collection of indirect lighting data, according to one embodiment of the invention. As shown, the method 200 begins at step 205 where a palette of simple shapes (blocks) is defined. In one embodiment, the palette of simple shapes includes each possible permutation of a cube with zero or more faces removed—resulting in a palette of nine shapes. Of course, one of ordinary skill in the art will recognize that the approaches for modular radiance transfer described herein may be adapted for use with a palette having more complex elements of scene geometry. For example, the palette could also include curved shapes, rectangular shapes, or blocks with less than a complete face being removed, etc. However, using a palette of simple shapes which includes cubes with zero or more faces removed has proven to be useful in generating a reasonable approximation for the indirect lighting in a variety of more complex 3D scene geometry.

In any event, once the palette of simple shapes is defined, at step 210, a lighting prior is computed for each block in the palette. As described in greater detail in conjunction with FIGS. 3 and 4 the lighting prior provides a compact lighting representation derived from a sampling a variety of direct lighting scenarios for a given block. For example, FIG. 3 illustrates an example of a block 305 lit using a spherical light source 310. In this example, the block 305 is a cube shown with the top face removed and the spherical light source 310 is placed in the center of the block. Placing the spherical light source 310 in the center of block 305 generally results in a fairly uniform direct lighting pattern on each face of the block 305.

As is known, the direst lighting scenario resulting from the placement of a light source (e.g., spherical light source 315)

in scene geometry (e.g., block 305) may be sampled and stored in a two dimensional (2D) texture. For example, texture 325 shows an "unrolling" of the block 305 generated by sampling the direct lighting from spherical light source 315. In one embodiment, each face of the block 305 is sampled using 16×16 samples, resulting in 256 direct lighting samples per face (and 1536 samples per block). Further, the sampled values of texture 325 may be stored in a column vector 330 (labeled as $X_d$). In the case where 16×16 lighting samples are taken per block face, $X_d$ is a 1536×1 column vector. The vector 330 provides a lighting representation for block 305 corresponding go the placement of the spherical light source 315 the center of block 305. Direct-to-indirect transfer techniques may be used to compute how incident lighting at these samples (i.e., the $x_i$ values of $X_d$) map to indirect (bounced) lighting through a single (or multiple) bounces throughout the scene. Mathematically this can be expressed as:

$$x_i = Tx_d$$

where $x_i$ and $x_d$ are n-dimensional vectors representing irradiance due to direct and indirect light, respectively, and T is an n×n matrix providing the one bounce transport operator that takes incident radiance over the surface of scene geometry and computes indirect lighting.

By moving the position of the spherical light source 315 (or using multiple light sources), a variety of different lighting representations like the one shown in FIG. 3 may be generated, i.e., different $X_d$ vectors, like vector 330 of FIG. 3 may be generated. This result is shown in FIG. 4, which further illustrates an example of generating a lighting prior from multiple direct lighting samples, according to one embodiment of the invention.

Illustratively, FIG. 4 shows set of lighting textures $405_{1-m}$. Each lighting texture $405_{1-m}$ is generated from a different placement of a spherical light source within the block of scene geometry (e.g., block 305). The direct lighting which results from each different placement of the spherical light source may then be used to generate a corresponding texture 405. In one embodiment, the direct lighting from a set of light source models are computed (e.g., textures $405_{1-m}$ are computed) and placed in the columns of a matrix A 410. While the number of distinct models may be determined as a matter of preference, the use of approximately two-hundred, randomly placed, spherical light sources within a block has proven to be useful. Once constructed, the matrix A 330 may be factorized using singular value decomposition (SVD) techniques. As is known, the SVD of matrix A 410 may be represented mathematically as:

$$A = U\Sigma V^T$$

where U provides the left singular vectors of A, $\Sigma$ is a diagonal matrix storing the singular values of A and the rows of $V^T$ provide the right singular vectors of A. Further, the n-th rank approximation of A may be taken as the outer product of the n left singular vectors (the U vectors) and the corresponding singular values (the diagonal values of the matrix $\Sigma$) and right singular vectors (the rows of $V^T$).

In one embodiment, a specified number (e.g., 32) of the left singular vectors (from the U matrix) are stored in a matrix P 415. Additionally, the singular values from $\Sigma$ corresponding to the column vectors of U may be stored in a diagonal matrix S (e.g., the 32 singular values taken from the $\Sigma$ matrix generated by the SVD of A). The columns of P provide a lighting prior representing a direct lighting space of the corresponding block (e.g., block 305). That is, a given direct lighting scenario of the block (i.e., an $X_d$ lighting state) can be represented as a linear combination of the lighting priors (i.e., of the left singular vectors in the U matrix). For example, a lighting texture (represented using a column vector ($X_d$)) can be projected into the light space of the lighting prior according to the following:

$$a_{1-b} = P^T x$$

giving b coefficients, i.e., giving $[a_1, a_2, a_3 \ldots a_b]$. Blending the columns of the P matrix 415, using the $[a_1, a_2, a_3 \ldots a_b]$ coefficients gives the lighting texture $X_d$. More simply, a direct lighting response computed for a given set of scene geometry (e.g. block 305) may be represented as a linear combination of the column vectors in prior matrix P 410 using the appropriate $a_{1-b}$ coefficients. And the indirect lighting ($X_i$) resulting from a given lighting texture $X_d$ can be represented mathematically as:

$$x_i = T(a_1 p_1 + \ldots + a_b p_b)$$

which can be refactored as $$x_i = a_1 T p_1 + \ldots + a_b T p_b$$

Thus, the indirect lighting ($X_i$) for a given direct lighting scenario ($X_d$) can be computed by projecting the direct lighting into the prior basis (giving the $a_{1-b}$ coefficients) and taking a linear combination of the $a_{1-b}$ coefficients (the product of the one bounce transport operator (T) and the prior matrix (P) 415). Note, T itself may be calculated for a given column of the ($p_i$) as an approximation using ray tracing approaches known to one of skill in the art.

In one embodiment, however, rather than use TP to determine indirect lighting, TPS itself is decomposed using SVD. Returning to the method 200 of FIG. 2, at step 215, the spectral decomposition (i.e., the SVD) of the one-bounce transport operator (i.e., TP) is computed. This can be represented mathematically as:

$$TPS = U\Sigma V^T$$

Once computed, in one embodiment, the top k singular vectors and corresponding singular values (e.g., the top 8) may be used to determine indirect lighting values for the scene geometry based on the direct lighting sampled at runtime. In one embodiment, the direct lighting is projected in to the light basis pre-computed for the simple shapes (according to an art-directable mapping discussed below).

Alternatively, however, rather than keep only a specified number of the top k singular values/vectors of U, all of the singular values/vectors are stored and at runtime, and only the top k are used. For example, a user may be able to configure how indirect lighting is done in a video game based on the computing/graphics hardware valuable. Similarly, the number of k singular values/vectors from the SVD of TPS may be used by a lighting artist or level designer as a simple level-of-detail technique. That is, indirect lighting of elements of scene geometry that are distant (relative to a camera position) can use fewer k values (and thus may be computed more quickly) than elements of senesce geometry more close which use more k values (increasing both accuracy and computing time).

At step 220, an implicit lighting scenario may be computed for the indirect lighting derived from the lighting priors. As described in greater detail below, the implicit lighting is used to determine how light bounces between connected blocks from the palette of simple shapes using "extensions" and "interfaces." As used herein, an extension refers to lighting that results from the direct lighting in one block bouncing as indirect lighting to a neighboring block, e.g., two blocks joined at an open face. And an interface refers to a light field used to determine how direct lighting in one block may bounce as indirect lighting to blocks two (or more) steps away.

As noted above, the SVD of TPS (the one-bounce transport operator for indirect lighting based on the prior matrix 415) may be determined. The resulting singular values (the U vectors of the SVD of TPS) each approximate an indirect lighting response corresponding to one of the lighting priors in the prior matrix 415 (which themselves approximate to one of the sampled direct lighting scenarios, i.e., the $X_d$ column vectors of matrix 410 of FIG. 4).

In one embodiment, the implicit lighting provides a lighting transport operator used to model a direct lighting state corresponding to an indirect lighting state. Recall that an indirect lighting state ($X_i$) may determined from a direct lighting state ($X_d$) as follows:

$$x_i = U\Sigma V^T S^{-1} P^T x_d$$
$$= Ub$$

where $U\Sigma V^T$ is the SVD of TPS, $P^T$ is the transpose of the P matrix 415 and $X_d$ is an arbitrary direct lighting scenario. That is, the indirect lighting ($X_i$) may be represented as the product of the k left singular vectors taken from the SVD of TPS and b (the product of $\Sigma V^T S^{-1} P^T X_d$). The goal is, given an indirect lighting state ($X_i$) computed from a first direct lighting state, to determine a second direct lighting state (U') that results in the indirect one ($X_i$). That is, can a U' be determined such that:

$$U'_{ext}b = T_{ext}x_d$$

where $T_{ext}$ is a transport operator used to map an arbitrary direct lighting scenario $X_d$ to That is, $T_{ext}$ provides an operator for determining how a lighting pattern in a first block, bounces to a second block, when the two blocks are adjacent to one another. Based on the relationships above, the following holds true:

$$T_{ext}(PSV\Sigma^{-1})b = T_{ext}PSV\Sigma^{-1}\Sigma V^T S^{-1} P^T x_d$$
$$= T_{ext}PSVV^T S^{-1} P^T x_d$$
$$= T_{ext}PP^T x_d$$
$$= T_{ext}x_d$$

Allowing the extension operator $U'_{ext}$ to be computed as follows:

$$U'_{ext} = T_{ext}(PSV\Sigma^{-1})$$

Once determined, the $U'_{ext}$ mapping is stored and may be used to transport indirect direct lighting from one of the palette of simple shapes to an adjacent shape as an extension.

Returning again to the method 200 of FIG. 2, at step 225, the lighting extensions may be determined for adjacent block lighting. In one embodiment, the "local" bounce of indirect lighting and the "extension" bounce may be computed as two step process and the resulting lighting summed to provide the indirect lighting for two adjacent elements of scene geometry. First, a "local" bounce is computed from a block to itself, and second, an "extension" bounce is computed from one block to its neighbors. FIGS. 5A-5B illustrate an example of this approach. As shown in FIG. 5A, two views $505_{1-2}$ of scene geometry illustrate how indirect light bounces between a first block 510 and a second block 515 connected at an adjacent plane. That is, the first block 510 and a second block 515 share a common face (denoted using a line 525).

As discussed above, the extension operator ($T'_{ext}$) may be used to compute how indirect lighting bounces between adjacent blocks, given a particular direct lighting scenario ($X_d$). This particular example shows how light bounces from each of the blocks 510 and 515 back to itself, relative to a spherical light source 520 shown in the block 515. As shown in view $505_1$, some of the direct light from spherical light source 520 bounces from block 515 to itself, i.e., the "local bounce" of the direct lighting within block 515. Similarly, view $505_2$ shows how some of the direct light from spherical light source 520 bounces to the geometry of block 510 and back to itself, i.e., the "local bounce" of the direct lighting within block 510.

FIG. 5B illustrates the extension bounce for the indirect lighting resulting from light source 520. Specifically, FIG. 5B, illustrates two views $505_{3-4}$ of the scene geometry represented by blocks 510 and 515 showing the extension lighting bounce between block 510 and block 515. In particular, view $505_3$ shows how some of the direct light from block 515 bounces from block 515 to block 510. Similarly, view $505_4$ shows how some of the direct light from spherical light source 520 bounces to the geometry of block 510 and then back to block 515. Summing the indirect lighting computed from both the local and extension bounces provides a smooth representation of indirect lighting for adjacent blocks drawn from the palette of simple shapes.

Returning again to the method 200, at step 230, the interfaces for distant blocks are computed. In one embodiment, extensions are used to derive the indirect lighting for immediate neighbors and interfaces are used to compute for more distant numbers in blocks of scene geometry. Further, an interface may be implemented by computing a light field at the interface. As is known, a light field provides a mechanism for aggregating light at a plane in a 3D graphics scene. Further, the process for generating a light field may include a selection of sample points chosen on the interface (e.g., a 256×256 grid at the open interface). Points on the plane may be sampled to determine what light aggregates at that point from the scene, as well as what light emanates from that point. Thus, the light filed approximates a direct light source. Once the sample points are selected, a matrix ($T_{vol}$) may be computed which takes direct light arriving at the interface (via a near or distant light source) and returns the spherical harmonic (SH) coefficients at the lighting samples. To do so, a similar approach to how the lighting extensions were constructed may be used. For example, $T_{vol}$ may be computed as follows:

$$T_{vol}(PSV\Sigma^{-1}) = U'_{vol}$$

$$U'_{vol}b = T_{vol}x_d$$

And the $U'_{vol}b$ provides the SH coefficients at a given interface. In addition, a gather matrix (G) may be pre-computed. Where each row of the gather matrix is for a gather sample and each column is a contribution from one of the interface coefficients. By computing the gather matrix G in this manner all that needs to be computed is $GU'_{vol}b$ in order to propagate light through an interface.

Figure 6C:
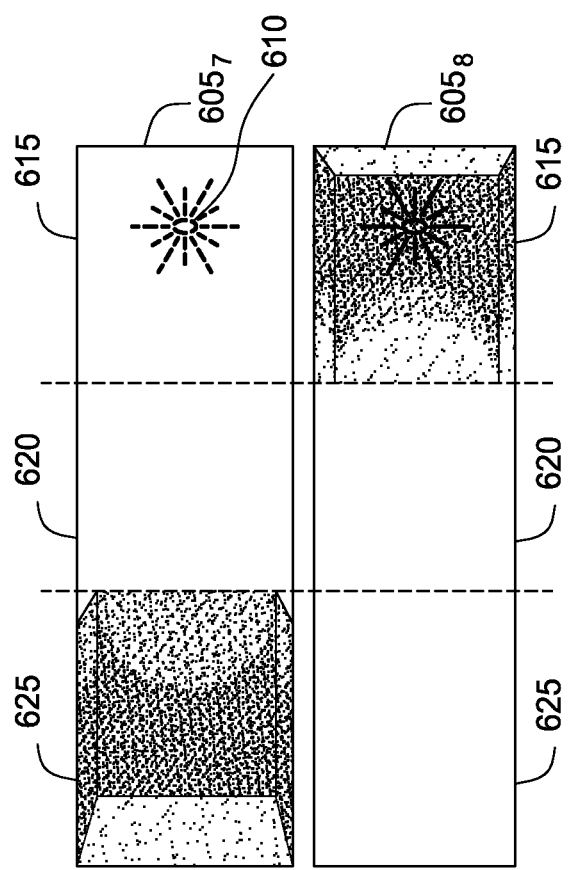

In one embodiment, using the techniques described above for computing the $T_{vol}$ matrix and gather matrix, an interface may be used along with a local bounce of indirect lighting and an extension bounce of indirect lighting to arrive at an indirect lighting scenario for a set of geometry composed from the simple shapes. For example, FIGS. 6A-6C illustrate an example of extensions and interfaces pre-computed from a light source and a palette of simple shapes, according to one embodiment of the invention. As shown in FIG. 6A, views $605_{1-3}$ of scene geometry each include three simple blocks, a leftmost block 625, a middle block 620, and a rightmost block 615. Further, block 615 includes a spherical light source. Views $605_{1-3}$ show how light from light source 610 bounces from a given block back to itself. View $605_1$ shows a local bounce of direct light from light source 610 from block 615 back to itself. View $605_2$ shows a local bounce of direct light from light source 610 from block 620 back to block 620. And lastly, view $605_3$ shows a local bounce of direct light from light source 610 from block 625 back to block 625. That is, views 6051-3 show the local bounce of indirect lighting within each of the blocks 615, 620, and 625, based on the direct light of light source 610.

FIG. 6B shows the extension bounce of indirect lighting from each of blocks 615, 620, and 625 to a neighboring block (or blocks). First, a view $605_4$ illustrates how some of the direct lighting from light source 610 bounces from block 615 to bock 620, as part of an extension bounce computed using the approaches described above. Note, as views $605_{4-6}$ illustrate indirect lighting for extension bounces, no indirect lighting flows from block 615 to block 625, as extensions are used to transport indirect lighting between adjacent blocks. Thus, view $605_5$ shows direct light from direct light source 610 as it bounces from block 620 to both of blocks 615 and 625, i.e., to both blocks adjacent to block 620. Lastly, view $605_6$ illustrates an extension bounce for block 625. In particular, some of the direct light from light source 610 is transmitted to block 625 and bounces to block 620.

FIG. 6C shows indirect lighting from each of blocks 615, 620, and 625 propagated to the interfaces of distant blocks, according to one embodiment of the invention. First, a view $605_7$ illustrates how some of the direct lighting from light source 610 bounces from block 615 to bock 625, through a light-field interface computed using the approaches described above. And second, a view $605_8$ illustrates how some of the direct lighting from light source 610 bounces from block 615 to bock 625 and back to itself. By summing the pre-computed lighting of the local bounces, extension bounces, and propagating the indirect lighting to lighting interfaces, the indirect lighting for a given direct lighting scenario (e.g., the light source 610) may be computed for scene geometry composed from the palette of simple shapes.

Returning again to the method 200 of FIG. 2, at step 235, a dictionary of the pre-computed indirect lighting data for each block in the palette of simple shapes is stored. In particular, the spectral decomposition of the one-bounce transport operator (i.e., the left singular vectors of the SVD of the TP matrix) the extension operators (i.e., the $U'_{ext}$ matrix), and the SH coefficients for the interfaces are stored for subsequent use in approximating the indirect lighting for an arbitrary set of scene geometry mapped to elements of the simple shapes and an arbitrary set of direct lighting states.

Figure 7:
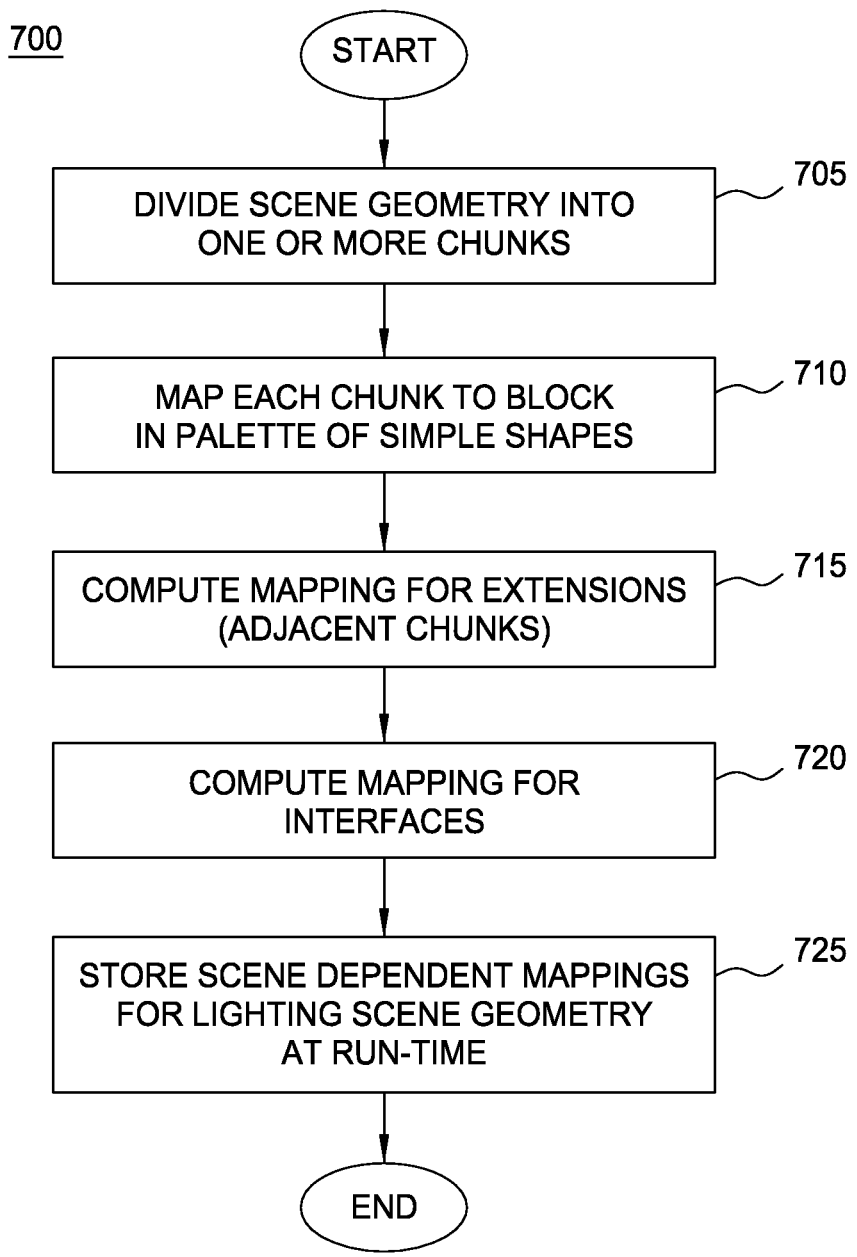
FIG. 7 illustrates a method for mapping 3D scene geometry to the palette of simple shapes in order to compute indirect lighting for the 3D scene geometry, according to one embodiment of the invention.

FIG. 7 illustrates a method 700 for mapping 3D scene geometry to the palette of simple shapes in order to compute indirect lighting for the 3D scene geometry, according to one embodiment of the invention. As shown, the method 700 begins at step 705, where a set of 3D scene geometry is divided into one or more chunks. At step 710, each chunk of scene geometry is mapped to one of the blocks in the palette of simple shapes. For example, consider 3D scene geometry modeling a left turn in a tunnel following a longer straight section. In such a case, a lighting artist could map generally equal sized sections of the tunnel to blocks in the palette of simple shapes, where the generally straight sections of the tunnel are mapped to blocks with two opposite faces removed and the left turn is mapped to a block with two adjacent faces removed. At step 715, once the geometry of the scene is mapped to simple shapes and the relative connections between the blocks have been mapped by the lighting artist, a mapping for extensions may be determined. In particular, blocks adjacent to one another may be identified based on the mapping of scene geometry to simple shapes. Continuing with the example of scene geometry representing a tunnel, a lighting extension between blocks having opposite two opposite faces removed and a lighting extension between a block representing the left turn (i.e., a block with two adjacent faces removed) would be identified.

At step 720, the mappings for interfaces may be identified, based on the mapping of scene geometry to the blocks from the palette. As described above, an interface is used to transport indirect lighting from one block to ones two or more steps away. Accordingly, elements of scene geometry mapped (at step 710) two steps away from one another are identified. And at step 725, the mappings determined at steps 710, 715, and 720, are stored for lighting the 3D scene geometry at run time.

Figure 8:
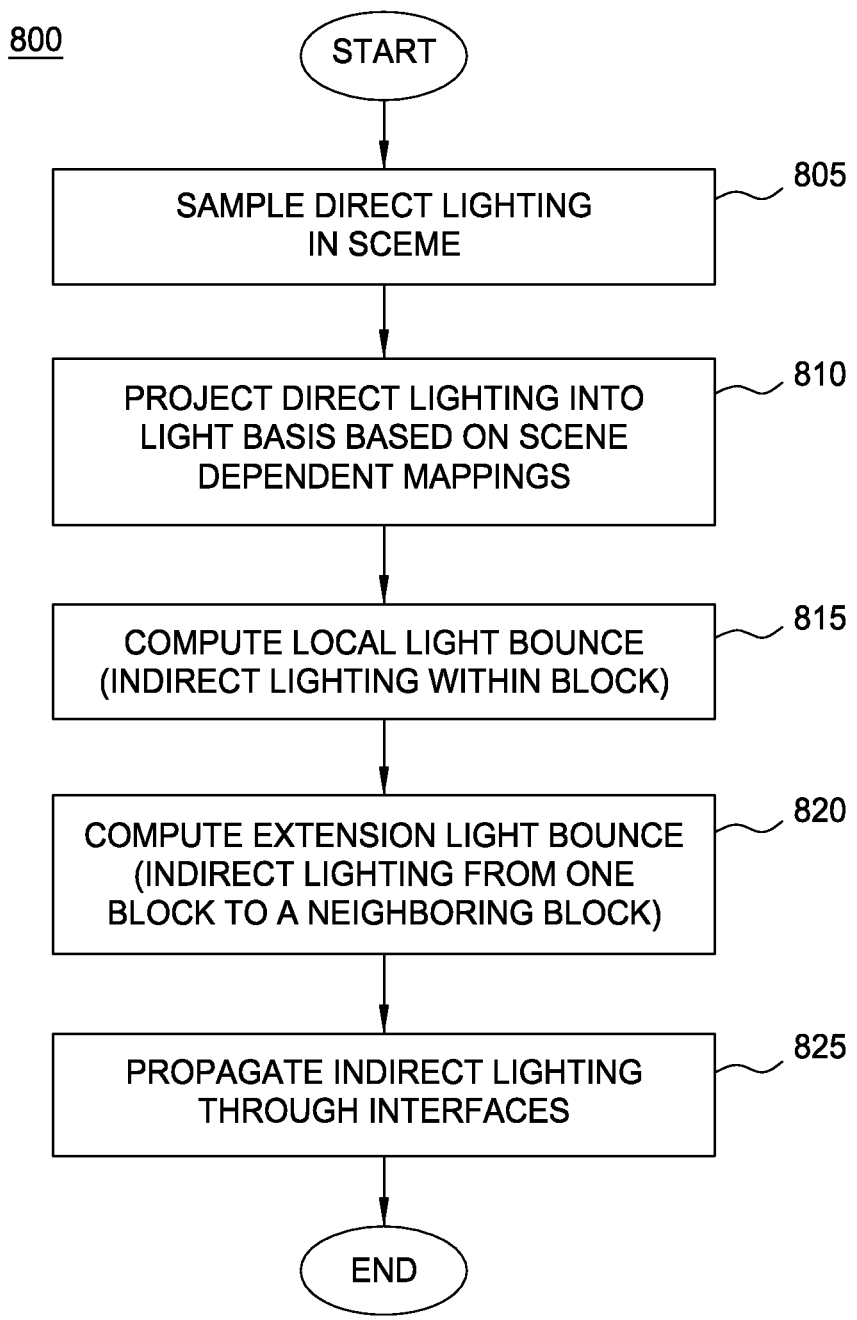
FIG. 8 illustrates a method for determining the indirect lighting for a given set of 3D scene geometry, based on a direct lighting scenario and a mapping form the 3D scene geometry to the palette of simple shapes, according to one embodiment of the invention.

FIG. 8 illustrates a method 800 for approximating the indirect lighting for a given set of 3D scene geometry, based on a direct lighting scenario and a mapping form the 3D scene geometry to a palette of simple shapes, according to one embodiment of the invention. As shown, the method 800 begins at step 805, where the direct lighting in a 3D graphics scene is sampled to obtain a direct lighting state based on one or more light sources in the 3D scene.

At step 810, the sampled direct lighting state is projected into the light basis derived from the lighting prior. That is, the coefficients $[a_1, a_2, a_3 \ldots a_b]$ needed to represent the direct lighting state $X_d$ as a linear combination of the top k vectors taken from the SVD of the one bounce transport operator TPS are determined, as described above. Once projected, the coefficients may be used to determine an approximate indirect lighting state for the direct lighting state sampled at step 810. At step 815, a local light bounce (indirect lighting within each block) is computed. That is, the local bounce of direct lighting within a block which results from the direct lighting state is determined (as represented by the $[a_1, a_2, a_3 \ldots a_b]$ coefficients). At step 820, the indirect lighting between adjacent blocks is determined using the extension operator, also as described above. Lastly, at step 825, the indirect lighting from a given block is propagated to interfaces, i.e., to any interfaces mapped to at step 720 of method 700 by the given block. Once determined for the simple shapes, the resulting indirect lighting may be mapped back to the actual 3D scene geometry. For example, the indirect lighting may be mapped back to the actual scene geometry by inverting the projection used to map the direct lighting samples into the lighting basis derived from the lighting prior.

In sum, embodiments of the invention use an approach for modular radiance transfer to pre-compute a spectral decomposition of a one bounce transport operator for each of a set of simple shape. Doing so allows the lengthy computation required for a computing direct-to-indirect lighting transfer based on complex scene geometry to be replaced with an art-directable mapping step. The one bounce transport operator provides a matrix for deriving the indirect lighting which results from a given direct lighting state and set of 3D scene geometry. Advantageously, modular radiance transfer provides an approach for rendering an approximate indirect lighting state for a set of 3D scene geometry which requires small amounts of data, can be used to model very large (or even random) scenes, and propagates much of the indirect lighting using a small number of spectral coefficients, allowing rendering to scale well to large scenes.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense. Other embodiments are described in the attached APPENDIX.

What is claimed is:

1. A computer-implemented method for computing indirect lighting in a three-dimensional (3D) graphics scene, comprising:
   providing a palette of shapes to represent 3D scene geometry;
   for one or more shapes from the palette:
      sampling a plurality of direct lighting states for the shape,
      generating a lighting prior from the sampled plurality of direct lighting states, and
      computing, from the lighting prior, a factorized transport operator, wherein the transport operator takes an arbitrary direct lighting state for the shape and returns a corresponding indirect lighting state;
   computing one or more extension operators, wherein each extension operator computes indirect lighting between two shapes from the plurality of shapes when adjacent to one another in a representation of the 3D scene geometry; and
   computing one or more interfaces for propagating indirect lighting between non-adjacent shapes.

2. The method of claim 1, further comprising:
   receiving data specifying a division of the 3D scene geometry into a plurality of chunks;
   receiving a mapping from each of the plurality of the chunks to one of the palette of shapes, thereby providing a mapped representation of the 3D scene geometry composed from the palette of shapes;
   receiving a direct lighting state for the 3D scene geometry;
   computing an indirect lighting state for the mapped representation of the 3D scene geometry based on the direct lighting state using the factorized transport operator; and
   mapping the indirect lighting state computed for the mapped representation of the 3D scene geometry to the chunks of 3D scene geometry.

3. The method of claim 2, further comprising, computing an extension bounce of indirect lighting between a first shape and a second shape in the mapped representation of the 3D scene geometry for shapes that are adjacent to one another, based on the extension operator.

4. The method of claim 3, further comprising, propagating indirect lighting from a first shape in the mapped representation of the 3D scene geometry to at least a second, non-adjacent, shape in the mapped representation of the 3D scene geometry.

5. The method of claim 1, wherein each shape in the palette of shapes comprises a cube with zero or more faces removed.

6. The method of claim 1, wherein the one or more extension operators is computed for a plurality of first shapes and second shapes selected from the palette, each being connected at a removed face.

7. The method of claim 1, wherein generating the lighting prior from the sampled plurality of direct lighting states comprises:
   generating a matrix (A), wherein each column of the matrix (A) corresponds to one of the sampled plurality of direct lighting states;
   computing a singular a singular value decomposition (SVD) of the matrix (A); and
   storing, as the lighting prior, a specified number of left singular vectors and corresponding singular values from the SVD of the matrix (A).

8. The method of claim 7, further comprising:
   computing a one bounce transport operator for the lighting prior, and
   computing a singular a singular value decomposition (SVD) of the one bounce one bounce transport operator;
   storing, as the factorized transport operator, a specified number of left singular vectors and corresponding singular values from the SVD of the one bounce transport operator.

9. A non-transitory computer-readable medium storing instructions that, when executed by a processor, cause a computer system to perform an operation for computing indirect lighting in a three-dimensional (3D) graphics scene, the operation comprising:
   providing a palette of shapes to represent 3D scene geometry;
   for one or more shapes from the palette:
      sampling a plurality of direct lighting states for the shape,
      generating a lighting prior from the sampled plurality of direct lighting states, and
      computing, from the lighting prior, a factorized transport operator, wherein the transport operator takes an arbitrary direct lighting state for the shape and returns a corresponding indirect lighting state;
   computing one or more extension operators, wherein each extension operator computes indirect lighting between two shapes from the plurality of shapes when adjacent to one another in a representation of the 3D scene geometry; and
   computing one or more interfaces for propagating indirect lighting between non-adjacent shapes.

10. The computer-readable medium of claim 9, wherein the operation further comprises:
   receiving data specifying a division of the 3D scene geometry into a plurality of chunks;
   receiving a mapping from each of the plurality of the chunks to one of the palette of shapes, thereby providing a mapped representation of the 3D scene geometry composed from the palette of shapes;
   receiving a direct lighting state for the 3D scene geometry;
   computing an indirect lighting state for the mapped representation of the 3D scene geometry based on the direct lighting state using the factorized transport operator; and mapping the indirect lighting state computed for the mapped representation of the 3D scene geometry to the chunks of 3D scene geometry.

11. The computer-readable medium of claim 10, wherein the operation further comprises, computing an extension bounce of indirect lighting between a first shape and a second shape in the mapped representation of the 3D scene geometry for shapes that are adjacent to one another, based on the extension operator.

12. The computer-readable medium of claim 11, wherein the operation further comprises, propagating indirect lighting from a first shape in the mapped representation of the 3D scene geometry to at least a second, non-adjacent, shape in the mapped representation of the 3D scene geometry.

13. The computer-readable medium of claim 9, wherein each shape in the palette of shapes comprises a cube with zero or more faces removed.

14. The computer-readable medium of claim 9, wherein an extension operator is computed for a plurality of first shapes and second shapes selected from the palette, each being connected at a removed face.

15. The computer-readable medium of claim 9, wherein generating the lighting prior from the sampled plurality of direct lighting states comprises:
  generating a matrix (A), wherein each column of the matrix (A) corresponds to one of the sampled plurality of direct lighting states;
  computing a singular a singular value decomposition (SVD) of the matrix (A); and
  storing, as the lighting prior, a specified number of left singular vectors and corresponding singular values from the SVD of the matrix (A).

16. The computer-readable medium of claim 15, wherein the operation further comprises:
  computing a one bounce transport operator for the lighting prior, and
  computing a singular a singular value decomposition (SVD) of the one bounce one bounce transport operator:
  storing, as the factorized transport operator, a specified number of left singular vectors and corresponding singular values from the SVD of one the bounce transport operator.

17. A system, comprising:
a processor; and
a memory configured to perform an operation for computing indirect lighting data for a three-dimensional (3D) scene geometry, the operation comprising:
  mapping each of a plurality of chunks of the 3D scene geometry to a shape provided by a palette of shapes, wherein a factorized transport operator has been pre-computed for each shape in the palette of shapes,
  computing an indirect lighting state for the shapes mapped to by the plurality of shapes using a sample of direct lighting for the 3D scene geometry and the factorized transport operator computed for the shapes, and
  mapping the indirect lighting state computed for the shapes mapped to by the plurality of shapes to the 3D scene geometry.

18. The system of claim 17, wherein each shape in the palette of shapes comprises a cube with zero or more faces removed.

19. The system of claim 18, wherein an extension operator is computed for a plurality of first shapes and second shapes selected from the palette, each being connected at a removed face, wherein each extension operator computes indirect lighting between two shapes from the plurality of shapes when adjacent to one another in the mapping of the plurality of chunks to the shapes.

20. A method for determining indirect lighting for 3D scene geometry, the method comprising:
  mapping each of a plurality of chunks of the 3D scene geometry to a shape provided by a palette of shapes, wherein a factorized transport operator has been pre-computed for each shape in the palette of shapes;
  computing an indirect lighting state for the shapes mapped to by the plurality of shapes using a sample of direct lighting for the 3D scene geometry and the factorized transport operator computed for the shapes; and
  mapping the indirect lighting state computed for the shapes mapped to by the plurality of shapes to the 3D scene geometry.

21. The method of claim 20, wherein each shape in the palette of shapes comprises a cube with zero or more faces removed.

22. The method of claim 20, wherein an extension operator is computed for a plurality of first shapes and second shapes selected from the palette, each being connected at a removed face, wherein each extension operator computes indirect lighting between two shapes from the plurality of shapes when adjacent to one another in the mapping of the plurality of chunks to the shapes.

* * * * *